J. T. MacCURDY & H. N. RUSSELL.
APPARATUS FOR PRODUCING PHOTOMETRIC WEDGES.
APPLICATION FILED JULY 14, 1916.
1,245,606.
Patented Nov. 6, 1917.
3 SHEETS—SHEET 1.
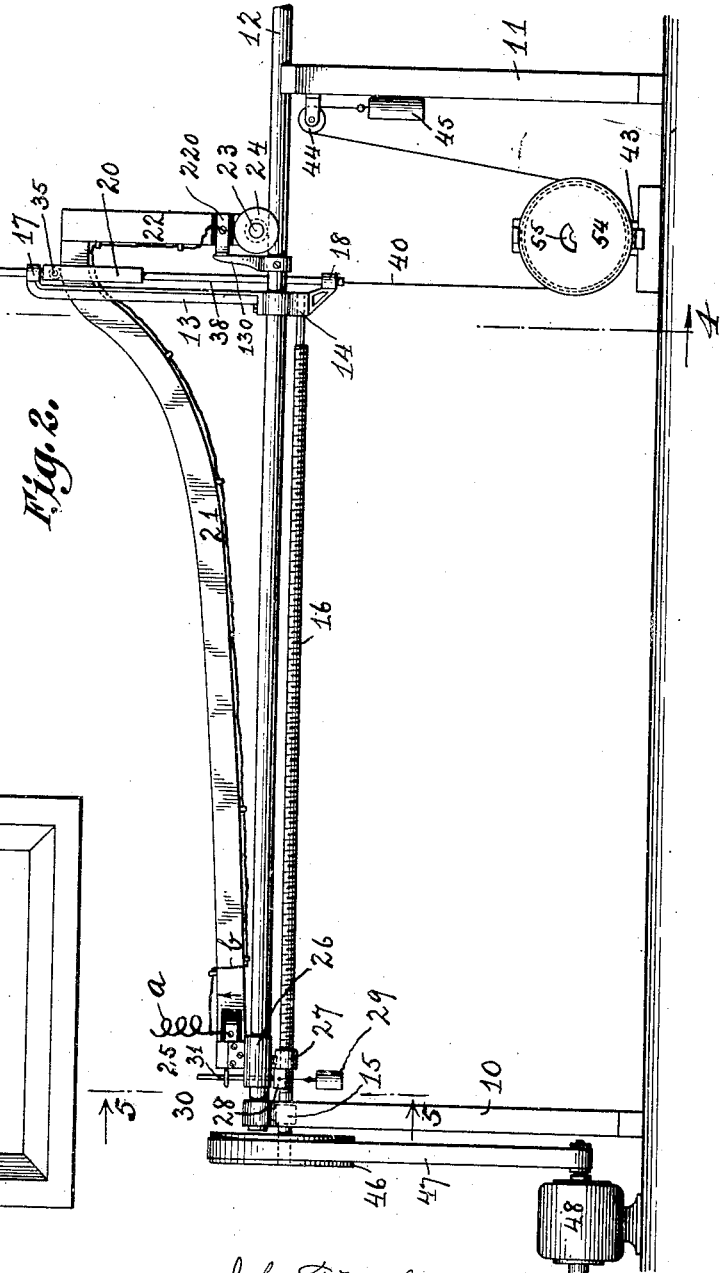
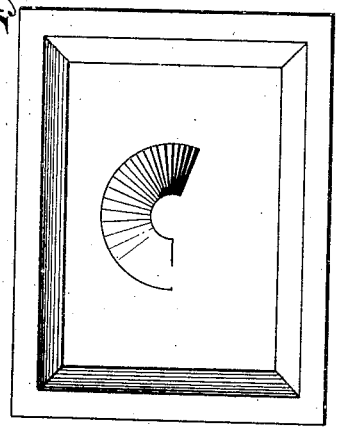
Inventor:
John T. MacCurdy,
Henry N. Russell,
by William R. Baird
Atty

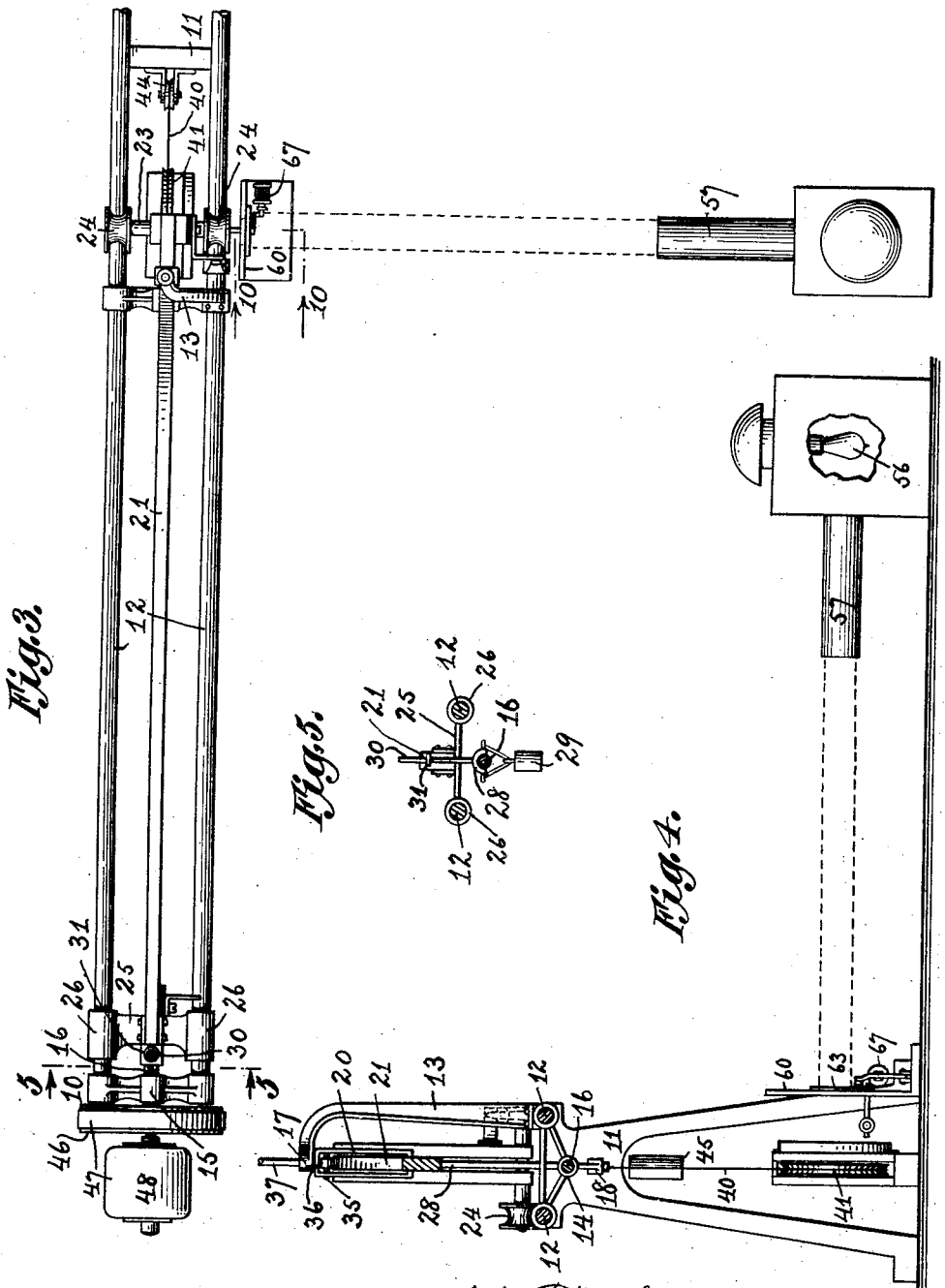

J. T. MacCURDY & H. N. RUSSELL.
APPARATUS FOR PRODUCING PHOTOMETRIC WEDGES.
APPLICATION FILED JULY 14, 1916.
1,245,606.
Patented Nov. 6, 1917.
3 SHEETS—SHEET 3.
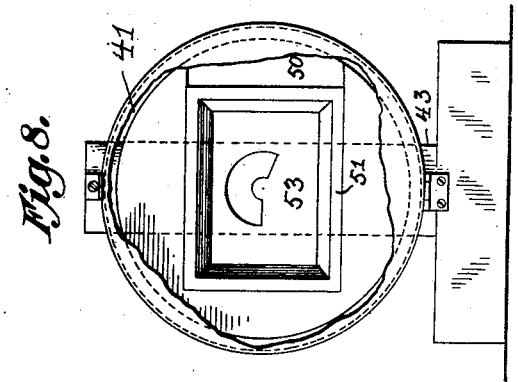
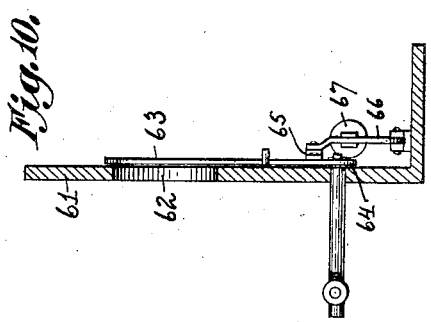
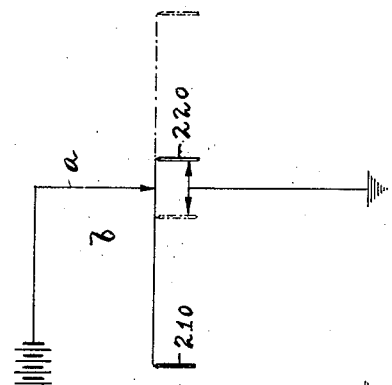
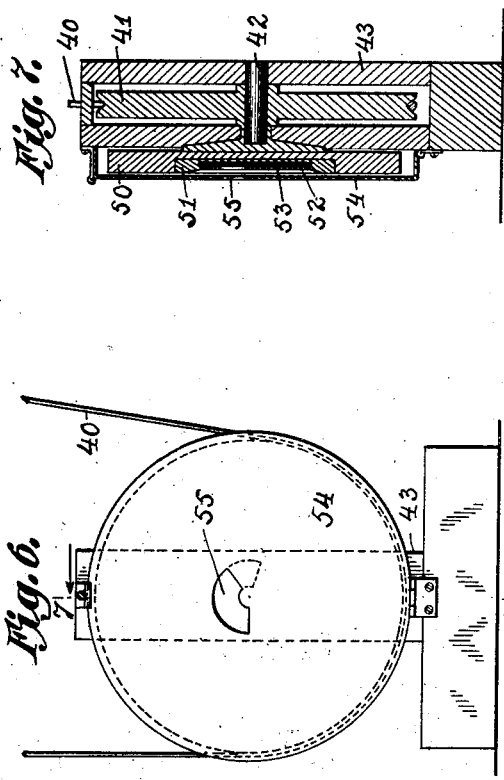
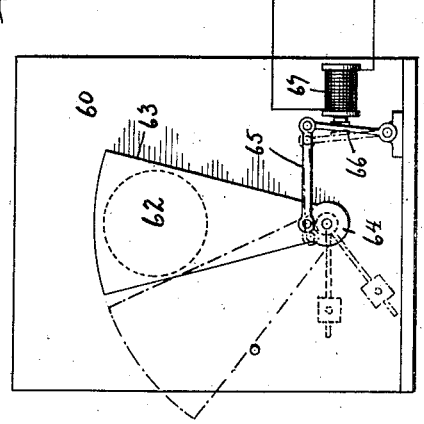
Inventor:
John T. MacCurdy
Henry N. Russell
by William R. Baird
Atty

UNITED STATES PATENT OFFICE.

JOHN T. MacCURDY, OF NEW YORK, N. Y., AND HENRY N. RUSSELL, OF PRINCETON, NEW JERSEY.

APPARATUS FOR PRODUCING PHOTOMETRIC WEDGES.

1,245,606.  Specification of Letters Patent.  Patented Nov. 6, 1917.

Application filed July 14, 1916. Serial No. 109,230.

*To all whom it may concern:*

Be it known that we, JOHN T. MACCURDY, a subject of the King of Great Britain, residing at New York, in the county of New York and State of New York, and HENRY N. RUSSELL, a citizen of the United States, residing at Princeton, in the county of Mercer and State of New Jersey, have invented certain new and useful Improvements in Apparatus for Producing Photometric Wedges, of which the following is a specification.

This invention relates to an apparatus to be used in the manufacture of photometric wedges by photographic means. A photometric wedge is a device varying in light transmitting power from one end to the other and generally transparent or translucent and utilized in determining a standard of visibility, using the light transmitting capacity of the wedge as a scale. It is obvious that a photometric wedge may be made of prismatic form and uniform light transmitting power throughout all of its substance; but in a number of relations it is desirable that such a wedge should be of uniform thickness, or even of a film-like nature, and that merely its surface should be provided with means for excluding the light in a progressively increasing degree. In a photographic time exposure meter, the invention of John T. MacCurdy, and made the subject-matter of an application for Patent, Serial No. 104,697, filed June 20, 1916, by which the appropriate time for the exposure of a photographic plate to secure a picture having a standard of visibility, could be directly read from a scale, it was found desirable to prepare an arcuate photometric wedge made of material of uniform thickness but with a light transmitting power varying according to a logarithmic law. The apparatus which is described in the following specification is designed to facilitate the preparation of such a wedge.

The purpose sought to be accomplished was to subject a sensitized photographic plate to the influence of a constant source of illumination, moving the plate with respect to the rays of light impinging upon its sensitized surface at a rate varying according to a law so determined that when the plate was developed its light transmitting power would vary according to a logarithmic law, the lightest portions of the plate being those which were moved with greatest velocity past the impinging light rays and the other portions of the plate progressively decreasing in light transmitting power according to the rate at which they were moved past such rays.

In brief, the means used to accomplish this purpose comprise a revoluble plate carrier on which is mounted a photographic sensitized plate subjected to the influence of rays of light from a constant source of illumination and which plate is revolved past the field of impingement of such rays at a rate determined by the shape of a predetermined curve. The movement at such rate is secured through a pulley in connection with a cable moved therefrom and which cable is subjected to a constant pull by means of a weight or the like but which moves through predetermined units of space in determinate times and not according to the law of gravitation.

In the drawings in which there is illustrated a preferred form of apparatus embodying our invention, Figure 1 is a miniature view of the photometric wedge as developed on a sensitized plate inclosed in a frame; Fig. 2 is a side elevation of the apparatus; Fig. 3 is a top plan view of the parts shown in Fig. 2; Fig. 4 is a vertical section on the plane of the line 4—4 in Fig. 2 and an elevation of the parts back of the section plane; Fig. 5 is a sectional detail taken on the plane of the line 5—5 in Fig. 3; Fig. 6 is an enlarged detail of the plate holder carrier; Fig. 7 is a vertical transverse section of the parts shown in Fig. 6, taken on the plane of the line 7—7 in Fig. 6; Fig. 8 is a side elevation of the parts shown in Fig. 6, the shield or curtain being broken away to show concealed parts; Fig. 9 is a detail of the shutter and a diagram of an electric circuit by which it is operated; and Fig. 10 is a vertical section through the structure shown in Fig. 9.

In the drawings, 10 and 11 represent upright standards of any suitable form, size or material and on which there is supported a pair of rails 12, 12 by which in turn there is carried an upright bracket 13, the lower end of which, indicated at 14, affords a bearing in connection with a similar bearing 15 in the standard 10 for a rotatable threaded shaft indicated at 16. The bracket is also provided with two arms 17 and 18 forming guides for a trolley wheel supporting frame generally indicated at 20.

Carried by and supported on the rails 12 is a frame comprising a longitudinal member 21, the upper edge of which is fashioned into a curve of predetermined contour, and which member is supported at one end on an upright member 22, provided at its lower end with a shaft 23 serving as an axle for a pair of rollers 24 adapted to be moved on the rails 12. At its opposite end the member 21 is supported by a transverse member 25, which carries a pair of sleeves 26 adapted to encircle and slide upon the rails 12. Beneath these sleeves there is arranged a third sleeve 27 adapted to encircle the threaded rod 16 without engaging its threads. Loosely resting on the threaded rod 16 is a semicylindrical nut 28 from which depends a weight 29 by which the engagement of the nut and the threaded rod is promoted. Above the nut is arranged a guide rod 30 passing loosely through a retaining ring 31 secured to the frame 25 or some other convenient part of the speed controller. The frame 20 has at its upper end a small shaft 35 upon which is secured a trolley wheel 36 adapted to roll along the upper edge of the speed controller 21. The frame is also provided with an upwardly extending rod 37 and a downwardly extending rod 38 adapted to pass respectively through the arms 17 and 18 of the bracket 13 in order to insure that the movement of the frame 20 and the two rods is maintained in a vertical direction. To the lower end of the rod 38 is secured a cable 40 made of any suitable size and material and which is adapted to pass under and engage a pulley 41 mounted on a shaft 42 suspended in a frame 43 which rests upon the floor or a suitable support below the rails 12, 12. The cable 40 is passed beneath and around the pulley 41 and thence is reversed and passed around a supporting wheel 44 and is provided at its extremity with a weight 45. It is obvious that if the frame 20 is vertically reciprocated in the bracket 13, the cable 40 under the tension of the weight 45 will frictionally engage the pulley 41 and cause the latter to revolve at a rate of speed proportional to the movement of the frame 20.

On the end of the threaded rod 16 is mounted a pulley 46 or other power transmitting device moved by a belt 47 from a prime mover indicated at 48. By this means, the threaded rod 16 is rotated, the nut 28 is thereby caused to travel longitudinally of the apparatus, and pushing against the sleeve 27, causes the sleeves 26 and controller 21 with its connected parts to be moved longitudinally, the wheels 24 rolling along the rails 12. As the controller 21 moves longitudinally, the trolley wheel 36 rolls against its upper edge, and obviously, as the ordinates of the upper curved edge of the controller 21 vary in height, the wheel moves downward vertically so far as it is permitted by the removal of the support underneath it. The frame 20 on account of the engagement of the guide rods 37 and 38 with the rings 17 and 18 on the bracket 13 is prevented from moving laterally. Consequently the pull on the cable 40, due to the tension exerted by the weight 45, is varied and the speed of movement of the cable 40 is proportionate to the height of the respective ordinates of the curve of the guide 21, and therefore, the speed of movement is variable and progressively decreasing in velocity depending upon the equation of this curve. The movement of the cable 40 being transmitted to the pulley 41 by its frictional contact therewith, it is obvious that the rotation of this pulley and the parts connected therewith must be also progressively variable in accordance with the law determined by the contour of the curved edge of the controller 21.

On the end of the shaft 42, there is secured a disk 50 provided with a longitudinal recess adapted to receive a plate carrier 51 which in turn carries a film or other sensitized photographic plate indicated at 52, and in front of which is arranged a mask 53 suitably apertured. Secured to the frame 43 is an external mask or curtain indicated at 54, and which is provided with an arcuate slot or aperture indicated at 55. Arranged at a convenient place with respect to the other parts of the apparatus is a source of constant illumination indicated at 56 and which is supported in a suitable casing and provided with a ray-directing tube indicated at 57 whereby the rays of light are thrown toward the plate carrier as indicated in Figs. 3 and 4.

Intermediate the plate carrier and the light there is arranged a shutter generally indicated at 60 and which comprises a permanent shield member 61 provided with an aperture 62 and in front of which there is adapted to be oscillated a shutter member proper 63 which is provided with a hub 64 mounted on a pivot and provided with a counterweight. Motion is imparted to the shutter member 63 by means of a link 65 and lever 66, the latter being an armature of an electromagnet 67 which is energized from an electric circuit in the usual manner. One of the conductors A leading from the battery is secured to an insulated contact 210 mounted on the controller 21. A lead from this indicated at B terminates in another contact 220 which is mounted on the member 22, the bracket 13 or supplemental piece 130 provided for that purpose serving as a ground for the circuit.

In the operation of the machine to make a photometric wedge, a suitable sensitized plate is put into the plate carrier, and the light 56 is turned on, the plate being shielded from the light by means of the cover and mask provided for that purpose. The semicylindrical nut 28 being moved to contact with the rod 16, and the prime mover being coupled to the pulley 46 or other power transmitting device, the shaft 16 begins to rotate and moves the nut 28, which in turn pushes against the sleeve 27 and slides the speed controller 21 toward the right, at the same time, breaking the electrical circuit through the conductor A and allowing the counterweight of the shutter 60 to move the shutter so that light from the lamp 56 falls upon the surface of the sensitized plate, which plate is rotated by the rotation of the pulley in the manner previously described, at first rapidly and then slowly, but on the whole, at a progressively decreasing velocity whereby the contact of the light with the plate so affects its sensitive surface that when it is developed an arcuate band of progressively decreasing light transmitting power is formed thereon in accordance with the law which dictated the formation of the contour of the upper edge of the speed controller 21. As soon as the travel of the speed controller is such that the bracket 13 or the supplemental member 130 contacts with the member 220, the electrical connections described cause the shutter to be immediately automatically restored to its normal position, limiting the actinic action of the light upon the sensitized plate to the time when the plate is traveling across the path of the light rays.

This invention is applicable, as will readily be understood, to any apparatus wherein a surface sensitive to light or other form of radiation is to be exposed to such radiation, for example, the X-rays, for the purpose of altering the structure, color or any other physical characteristic of the plate or any part of it. Of course it is immaterial in this connection in what precise manner, either actual or theoretical, the impinging rays act upon the surface to which they are exposed; it may be by chemical change, absorption or change according to any other physical law, and yet the result would be a surface or plate having variable physical characteristics in accordance with the outline of the curve of predetermined contour which controls the speed of movement of the device by which it is carried during its travel through the path of the rays in question. The contour of this curve may be predetermined in such a manner that the resulting physical characteristics of the completed surface or plate may vary along its circumference in accordance with any desired law. The exact form of the controlling curve may be computed when the effect upon the plate of exposure to one radiation for different times is known.

We claim:

1. An apparatus for producing photometric wedges, comprising a source of constant illumination, and means for causing a plate sensitive to light to travel across the path of the light rays therefrom at a rate varying according to a logarithmic curve.

2. A device of the character described, comprising a constant source of light, and means for causing a plate sensitive to light to travel across the path of a pencil of rays from the source of light at a variable rate in accordance with a curve of predetermined contour.

3. A device of the character described, comprising a source of light of constant strength, and means for causing a plate sensitive to light to travel across the path of a pencil of rays from the source of light at a variable rate progressively decreasing in velocity.

4. A device of the character described, comprising means for producing a pencil of light rays of constant intensity, and means for causing a plate sensitive to light to traverse, in accordance with the equation of a curve of predetermined outline, the path of said pencil of light rays.

5. An apparatus for producing photometric wedges, comprising means for producing a pencil of light rays of constant intensity, and means for causing a plate sensitive to light, to move in accordance with a curve of predetermined contour across the path of said pencil of light rays, in combination with means for excluding all light from the plate before the commencement of and after the completion of its travel.

6. An apparatus for producing photometric wedges, comprising means for producing a pencil of light rays of constant intensity, and means for causing a plate sensitive to light to be relatively moved in accordance with a curve of predetermined contour across the path of said pencil of light rays, and means for excluding light from the plate except during its travel, including a shutter normally interposed between the plate and the light producing means, and means for moving said shutter into and out of such position by the operation of the plate operating means.

7. An apparatus for producing photometric wedges comprising means for producing a pencil of light rays, means for moving a sensitized plate across the pencil of light rays at a variable rate progressively varying in velocity and means automatically operated from the means for moving said plate for excluding all light from the plate except during the time of its travel.

8. In a device of the character described, a photographic plate holder, and means for rotating it through a predetermined arc at a predetermined speed, said means comprising a pulley, a cable in frictional operative contact therewith, means for producing a constant pull on one end of the cable and means including a wheel for partially resisting said pull, a support on which said wheel is adapted to rest and roll, and means for moving the support.

9. In a device of the character described, a photographic plate holder, means for rotating it, and means for controlling a variable speed of such rotation, said means comprising a pulley and an actuating cord, a device for producing a constant tension on the cord, a rolling holder secured to the other end of the cord, and a movable support on which it is adapted to roll.

10. In combination, a sensitized plate carrier, and means for revolving it through a predetermined arc at a predetermined variable rate of speed, said means comprising a rotating support for the carrier, including a pulley, means including a pulley for exerting a constant pull on the pulley in one direction, and means for variably resisting such pull including a device secured to one end of the cable.

11. In a device of the character described, a pulley adapted to carry a photographic plate, and means for rotating the pulley at a variable rate, said means comprising a roller, a cord depending therefrom, and supported thereby, and which cord passes partially around the pulley, and a weight on the opposite end of the cord, in combination with a support for the roller and means for moving the support horizontally.

12. In a device of the character described, a pulley adapted to carry a photographic plate and means for rotating the pulley at a variable rate, said means comprising a roller, a cord depending therefrom and adapted to pass around the pulley, a weight adapted to place a constant tension on the cord, in combination with means including a longitudinally movable support for moving the roller vertically under such tension.

13. In combination, a sensitized film carrier, and means for revolving it through a predetermined arc at a predetermined variable rate of speed, said means comprising a pulley coupled to the carrier, a trolley, a frame secured to the trolley, a cord fastened to and depending from the frame and in frictional contact with the pulley, a weight secured to the cord, and a movable support of predetermined outline for the trolley, in combination with means for moving the movable support whereby the downward movement of the cord is varied and predetermined.

14. An apparatus for making photometric wedges comprising a sensitized plate carrier, a constant source of illumination, a shutter normally interposed between the plate carrier and such source, means for causing the plate carrier to travel across the path of the light rays from the source of illumination, said means including a curved speed controller, and means for automatically actuating the shutter at the beginning and completion of the travel of the plate.

15. An apparatus for making photometric wedges, comprising a sensitized plate carrier, a constant source of illumination, a shutter normally interposed between the plate carrier and such source, means for causing the plate carrier to travel across the path of the light rays from the source of illumination, said means including a curved speed controller, a threaded shaft, means for rotating said shaft continually, and a nut traveling on the shaft and adapted to move the controller in combination with means for automatically actuating the shutter at the beginning and completion of the travel of the plate.

16. An apparatus for making photometric wedges, comprising a sensitized plate carrier, a constant source of illumination, a shutter normally interposed between the plate carrier and such source, means for causing the plate carrier to travel across the path of the light rays from the source of illumination, said means including a curved speed controller, a threaded shaft, means for rotating said shaft continually, and a nut traveling on the shaft and adapted to move the controller, and means for automatically actuating the shutter at the beginning and completion of the travel of the plate, said means including an electromagnet, a source of electrical energy in circuit therewith, an armature lever adapted to move the shutter, and contacts operated by the controller to open and close the circuit.

17. An apparatus for making photometric wedges, comprising a photographic plate carrier, a light producing means, a shutter normally interposed between the carrier and the light producing means, means for causing the carrier to travel across the path of the light, said means including a cord and pulley, means comprising a trolley from which said cord is suspended for regulating the movement of the cord, a support movable under the trolley to retard its downward movement, and means for moving the support, said moving means consisting of a threaded shaft and a nut in engagement with the trolley moving means.

18. In a device of the character described, a speed controller including a frame, a support on which the frame is supported and adapted to slide, a threaded shaft, means for rotating the same, and means for moving the controller frame, said means consisting of a nut adapted partially to encircle and engage the threaded shaft, and means including a weight depending from said nut for maintaining engagement between the nut and shaft, in combination with a photographic plate carrier, an operative connection between it and the speed controller, a source of electrical energy, a source of light, a shutter interposed between the carrier and the source of light, and a make and break electrical connection between the controller, the source of electrical energy and the shutter, whereby the shutter is moved in one direction as the controller starts to move and in the opposite direction as the controller ceases to move.

19. An apparatus for producing photometric wedges comprising a source of light rays, a holder for a plate sensitive to light, and means for moving the holder and the source of light rays relatively and in accordance with a curve of predetermined contour.

20. An apparatus for producing photometric wedges comprising a source of light rays, a holder for a plate sensitive to light, and means for moving the holder and the source of light rays relatively and in accordance with a logarithmic curve.

21. An apparatus for producing photometric wedges comprising a source of light rays, a holder for a plate sensitive to light, and means for moving the holder and source of light rays at a variable rate relatively decreasing in velocity.

In witness whereof we affix our signatures.

JOHN T. MacCURDY.
HENRY N. RUSSELL. [L. s.]

In presence of—
HERBERT T. MAGRUDER.
Witness as to Henry N. Russell:
WALTER B. HOWE.

Copies of this patent may be obtained for five cents each, by addressing the "Commissioner of Patents, Washington, D. C."